April 21, 1959

H. A. CLAY 2,882,693

CONTROL SYSTEM FOR SEPARATION PROCESS

Filed July 21, 1955

*INVENTOR.*
H. A. CLAY
BY Hudson and Young
ATTORNEYS

INVENTOR.
H.A. CLAY

United States Patent Office 2,882,693
Patented Apr. 21, 1959

2,882,693

CONTROL SYSTEM FOR SEPARATION PROCESS

Harris A. Clay, Phillips, Tex., assignor to Phillips Petroleum Company, a corporation of Delaware Application July 21, 1955, Serial No. 523,461

10 Claims. (Cl. 62—21)

This invention relates to the control of separation processes. In one of its aspects, it relates to a control system which automatically controls a separation process so as to produce two products of specification quality. In another of its aspects, it relates to a method of controlling the operation of fractional distillation columns so as to process a maximum quantity of feed while obtaining two products of specification quality.

In the petroleum and petro-chemical industries, considerable effort has been directed in recent years toward the development of more efficient separation processes. One of the most important aspects of this work concerns improvements in the control of separation processes so as to obtain a product stream having a specified purity. In the prior art separation processes which utilize fractionation columns, it is conventional to control the processes so that one stream only of specification quality is recovered as a product, the purity of the other product stream being in effect disregarded. For example, when the desired product is taken overhead from a fractionation column, the column is controlled so that the overhead product has the desired purity while the bottoms product has the composition resulting from the removal of all the remaining feed components as bottoms product.

When processing certain feed streams, which are essentially binary systems, it would be desirable to effect a separation so as to recover two products of specification quality. Such a separation would eliminate the necessity for further treatment of one of the column product streams as required in conventional processes, thereby bringing about a substantial saving in operational costs. Furthermore, it would be desirable if the fractionation equipment could be operated so as to process the maximum quantity of feed while producing the two products of specification quality. It may happen when separating an essentially binary feed mixture that there will be a sudden increase in the amount of a third component which is present in the mixture in a small amount. As a result of such an increase, the purity of one of the product streams is concomitantly decreased so that the recovered product has a purity less than that which is desired. In accordance with this invention, a control system is provided which automatically controls the operation of a fractional distillation column so as to produce two products of specification quality at the maximum rate obtainable with the installed equipment while at the same time compensating for any changes in product purity caused by an increase in the amount of a third component present in the binary feed mixture.

The following are objects of the invention.

It is an object of this invention to provide a method for controlling separation processes.

Another object of the invention is to provide a control system for use with a fractional distillation column, which makes possible the recovery of two products of specification quality.

Still another object of the invention is to provide an improved method for controlling the operation of a fractional distillation column.

A further object of the invention is to provide a method for separating an essentially binary mixture into two products of specification quality.

Still other and further objects and advantages of the invention will become apparent to those skilled in the art upon consideration of the following disclosure.

The present invention is applicable to the control of fractional distillation columns. In separation processes of the type with which this invention is concerned, use is made of towers or columns to effect the separation of the components in one operation. Fractionation columns which may be employed include sieve plate columns, bubble-cap plate columns, packed columns, and the like. Where a considerable difference in boiling points exists between the component to be separated and the other components in a feed mixture, simple fractional distillation is generally used to effect the desired separation. In such a process, there are certain process variables which must be closely controlled in order to bring about an efficient separation. These variables in an ordinary fractional distillation process include rate of overhead product withdrawal, rate of bottoms product withdrawal, rate of reflux, rate of feed introduction and rate of supply of reboiler heat to the column. Since all of these variables are interrelated, a change in one of the variables causes a simultaneous shift in one or more of the other variables.

Broadly speaking, the present invention resides in a means and method for controlling the operation of a fractionation column so as to produce two products of specification quality. In a broad aspect, the method of this invention relates to the separation of an essentially binary mixture and comprises analyzing a first sample removed from the upper portion of a fractionation column to determine the concentration therein of a first component of the mixture being separated, analyzing a second sample removed from the lower portion of the column to determine the concentration therein of a second component of the mixture, analyzing one of the first and second samples to determine the concentration therein of a third component present in the mixture in a small amount, adjusting two of the process variables so that the concentration of the first and second components in the mixture is maintained at preselected values, and changing the preselected value of concentration of one of the first and second components in accordance with the concentration of the third component in one of the first and second samples.

In accordance with the present invention, control over the separation processes so as to obtain two products of specification quality is effected automatically in a continuous manner through the novel utilization of three infrared analyzers. Two of these analyzers, which are sensitized for the two principal components of an essentially binary mixture to be separated, operate with associated recorder-controllers to adjust two of the process variables. The third analyzer, which is sensitized for a third component, with its associated recorder-controller acts as an override for the recorder-controller of one of the aforementioned two analyzers. Thus, if the concentration of the third component increases above a predetermined value, the index setting of the last mentioned recorder-controller is reset in accordance with the increase in concentration of the third component so that the concentration of the principal component in the product stream remains at a desired value. It is to be understood, however, that the invention is not limited to infrared analyzers, for other analytical instruments, e.g., mass spectrometers, can be used. When employing infrared analyzers, this invention is applicable to the separation of essentially binary mixtures containing components having distinctive radiation absorption bands. The term "binary mixture" as used herein is intended to include a multi-component mixture which can be divided into two classes or groups of materials, each of which exhibit characteristic radiation absorption bands. As is well known, heteratomic molecules, i.e., those containing more than one kind of element, have the property of absorbing light energy in the infrared spectrum only at certain wave lengths which are characteristic of the molecule under consideration. Thus, a relatively simple analytical instrument can be provided by directing two beams of infrared radiation from a common source through a common sample cell to strike suitable radiation detectors. By placing a pure sample of the material whose presence is being determined in a filter cell disposed in one beam of radiation, any difference in intensity of the two beams impinging upon the respective detectors is indicative of the concentration of the particular substance in the sample stream.

A more complete understanding of the invention can be obtained by referring to the following detailed description and the drawing, in which.

Figure 1:
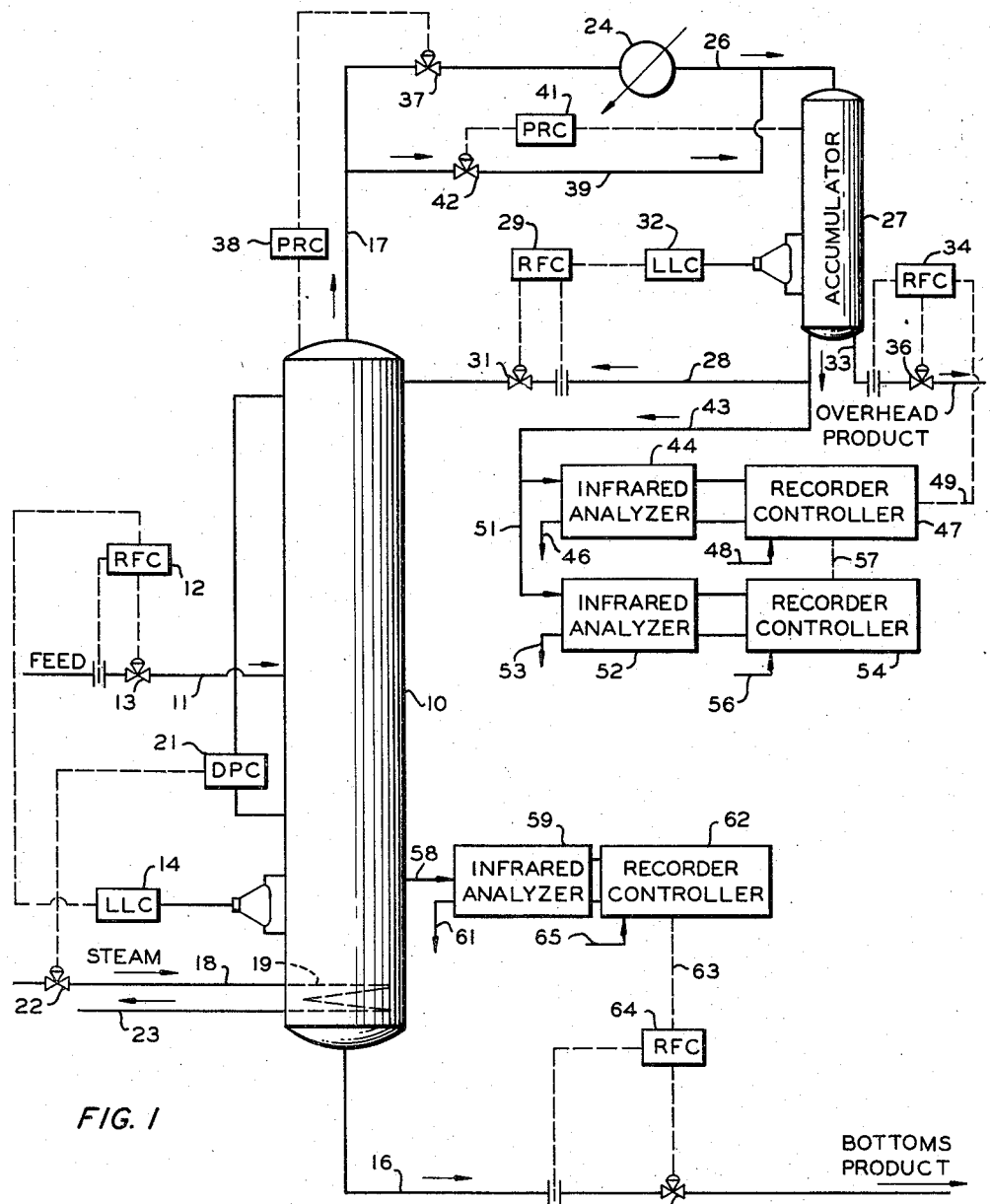
Figure 1 is a schematic view of fractional distillation apparatus, including the analysis control system of this invention.

Referring now to the drawing and particularly to Figure 1, there is illustrated a fractional distillation column 10 of any suitable design employing vapor-liquid contacting means, such as bubble-cap plates or the like. The essentially binary feed mixture to be separated is charged to column 10 through line 11 at a rate controlled by rate-of-flow controller 12 which adjusts a valve 13 in line 11. The rate-of-flow controller is provided with a pneumatic set mechanism. A liquid level controller 14, which is attached to the lower portion of column 10, is operatively connected to the pneumatic set mechanism associated with rate-of-flow controller 12. Thus, the rate at which feed is charged to the column through line 11 is controlled by liquid level controller 14 in response to the liquid level in the lower portion of the column. Within column 10, the feed mixture is separated into a liquid kettle product, which is withdrawn through line 16, and a vaporous overhead product, which is withdrawn through line 17.

Reboiler heat is supplied to the lower portion of column 10 through a steam line 18 which communicates with coils 19 disposed in the lower portion of the column. The rate of addition of steam to coils 19 is controlled by a differential pressure controller 21 which adjusts a valve 22 in line 18. The differential pressure controller, which measures the pressure drop through the column, is given a setting corresponding to the pressure drop desired to be maintained through the column. A pneumatic signal proportional to the column pressure drop is supplied to valve 22 with the result that the valve is adjusted so that steam is supplied to the lower portion of the column at a rate sufficient to maintain a pressure drop through the column corresponding to the setting of the differential pressure controller. The steam condensate is removed from coils 19 through line 23.

The vapors and/or gases comprising the relatively light components of the feed mixture supplied to column 10 are passed from the upper portion of the column through line 17 to a condenser 24 wherein they are condensed. The resulting condensate together with any other components are directed through line 26 to a reflux accumulator 27. A regulated quantity of the distillate collected in accumulator 27 is discharged therefrom through line 28 back into the upper portion of column 10 as reflux. The rate at which distillate is returned to column 10 as reflux is controlled by a rate-of-flow controller 29, which regulates a valve 31 in line 28. Rate-of-flow controller 29 is provided with a pneumatic set mechanism. A liquid level controller 32, which is attached to accumulator 27, is operatively connected to the pneumatic set mechanism associated with rate-of-flow controller 29. Accordingly, the liquid level controller operates through the pneumatic set mechanism to reset the index setting of the rate-of-flow controller in accordance with the liquid level in accumulator 27. As a result, reflux is supplied to the upper portion of column 10 at a rate sufficient to maintain a desired liquid level in accumulator 27. Line 33 provides means for withdrawing overhead product from accumulator 27. The rate at which overhead product is removed through line 33 is controlled by rate-of-flow controller 34 which adjusts valve 36 contained in line 33. Rate-of-flow controller 34 is also provided with a pneumatic set mechanism. In order to maintain a desired operating pressure in column 10, an automatic pressure control valve 37, responsive to pressure recorder-controller 38, is provided in line 17. A line 39 serves to bypass condenser 24. The rate of flow in line 39 is controlled by a pressure recorder-controller 41 which adjusts valve 42 in response to the pressure in reflux accumulator 27.

In order to attain a better understanding of the invention, the fractional distillation process will be described with relation to a specific separation such as the separation of isobutane from normal butane. Accordingly, an essentially binary mixture of normal butane and isobutane containing a small amount of propane is charged to column 10 through line 11. It is to be understood that the invention is not limited to this specific separation, for it is applicable to the separation of any essentially binary mixture, the components of which absorb infrared radiation at different wave lengths. For example, the invention can be advantageously used in the separation of mixtures of isopentane and normal pentane, ethylene and ethane, propylene and propane, etc. The instant invention can also be used in the separation of multi-component mixtures containing components which can be divided into two classes or groups of materials, each of which absorb infrared radiation at different wave lengths. The invention is especially applicable to the separation of binary mixtures which in addition to the two principal components may contain a third or fourth component, the concentration of which in the feed mixture may vary materially during the separation process.

In the separation of normal butane and isobutane, isobutane is taken overhead as one product of the process while normal butane is recovered from the bottom of the column as the other product. When the feed mixture contains a third component such as propane, this component is removed from the column along with the isobutane. It should be apparent that if the concentration of propane in the feed mixture varies during the separation, the purity of the overhead product will be decreased a corresponding amount unless steps are taken to compensate for such increases in propane concentration. By carrying out the separation utilizing three analytical instruments such as infrared analyzers to control the rate of overhead product withdrawal and the rate of bottoms withdrawal, it is possible to obtain two products of specification quality while at the same time compensating for any sudden increases in the concentration of propane in the feed mixture. It is also within the contemplation of the invention to utilize the three infrared analyzers to control other variables than those mentioned. For example, the infrared analyzer used to control the rate of flow of bottoms product can be used instead to control the rate at which reboiler heat is supplied to the column in which case the bottoms product withdrawal can be placed on liquid level control and reflux can be placed on differential pressure control.

A sample stream is removed from the bottom of accumulator 27 through line 43 and a portion thereof passed to infrared analyzer 44 which has been sensitized for normal butane. Alternatively, the sample can be taken from one of the upper plates in the column and passed to the analyzer. It is to be understood that when the sample is taken from a plate in the upper portion of the column, the amount of normal butane in the sample will be greater than when the sample is taken from the overhead stream. However, a determination of the amount of normal butane which should be present in the sample removed from the tray in order to give a product having a desired composition can be easily made by one skilled in the art. Line 46 provides means for removing the sample stream from analyzer 44.

The output signal from analyzer 44 is applied to potentiometer recorder-controller 47 which is supplied with a source of input air through line 48. Controller 47 provides a regulated output air pressure in line 49 which is proportional to the signal from analyzer 44. It is noted also that the pressure in line 49 is proportional to the amount of normal butane contained in the sample stream. As mentioned hereinabove, rate-of-flow controller 34, which adjusts valve 36 in line 33, is provided with a pneumatic set mechanism. The output air pressure in line 49 is applied to the pneumatic set mechanism which in turn adjusts the set point of rate-of-flow controller 34. In this manner, the rate at which overhead product is withdrawn from the column is controlled in accordance with the amount of normal butane contained in the sample stream.

A portion of the sample stream removed from accumulator 27 through line 43 is passed by means of line 51 to infrared analyzer 52 which has been sensitized for propane. A line 53 is provided for the withdrawal of the sample stream from the analyzer. The output signal from analyzer 52 is applied to potentiometer recorder-controller 54 which is supplied with a source of input air through line 56. Controller 54 provides a regulated output air pressure in line 57 which is proportional to the signal from analyzer 52. The pressure in line 57 is proportional to the amount of propane contained in the sample stream. Recorder-controller 47 is provided with a pneumatic set mechanism, and the output air pressure in line 57 is applied to this mechanism which in turn adjusts the set point of controller 47. Thus, the index setting of controller 47 is decreased in an amount corresponding to any increase in concentration of propane in the sample stream above a preselected value.

Another sample stream is removed from the lower portion of column 10 through line 58 and passed to infrared analyzer 59 which has been sensitized for isobutane. The sample can be taken from one of the lower plates, e.g., in an 80-tray column it can be advantageously taken from the 20th tray from the bottom of the column. As noted hereinabove with regard to the first sample stream, the amount of isobutane which should be present in the sample in order to provide a bottoms product of desired purity can be easily determined. It is also within the scope of the invention to take the sample stream directly from the column kettle. The sample is removed from analyzer 59 through line 61. The output signal from analyzer 59 is applied to potentiometer recorder-controller 62 which is supplied with a source of input air through line 65. Controller 62 provides a regulated output air pressure in line 63 which is proportional to the signal from analyzer 59. The output air pressure in line 63 is also proportional to the amount of isobutane contained in the sample stream. Rate-of-flow controller 64 which adjusts a valve 66 in bottoms withdrawal line 16 is provided with a pneumatic set mechanism. The output air pressure in line 63 is applied to the pneumatic set mechanism which in turn adjusts the set point of rate-of-flow controller 64. The rate at which the bottoms product, normal butane, is withdrawn from the column is thus controlled in accordance with the amount of isobutane contained in the sample stream. As described hereinabove, infrared analyzers 44 and 59 and their associated controllers function as overrides for rate-of-flow controllers 34 and 64. While it is desirable from an operational standpoint to provide the rate-of-flow controllers so as to insure regulated flow within definite limits if the infrared analyzers should for some reason fail to operate properly, it is within the scope of the invention to omit the rate-of-flow controllers. When the rate-of-flow controllers are not used, infrared analyzers 44 and 59 and their associated controllers are used to directly control valves 36 and 66 in lines 33 and 16.

Figure 3:
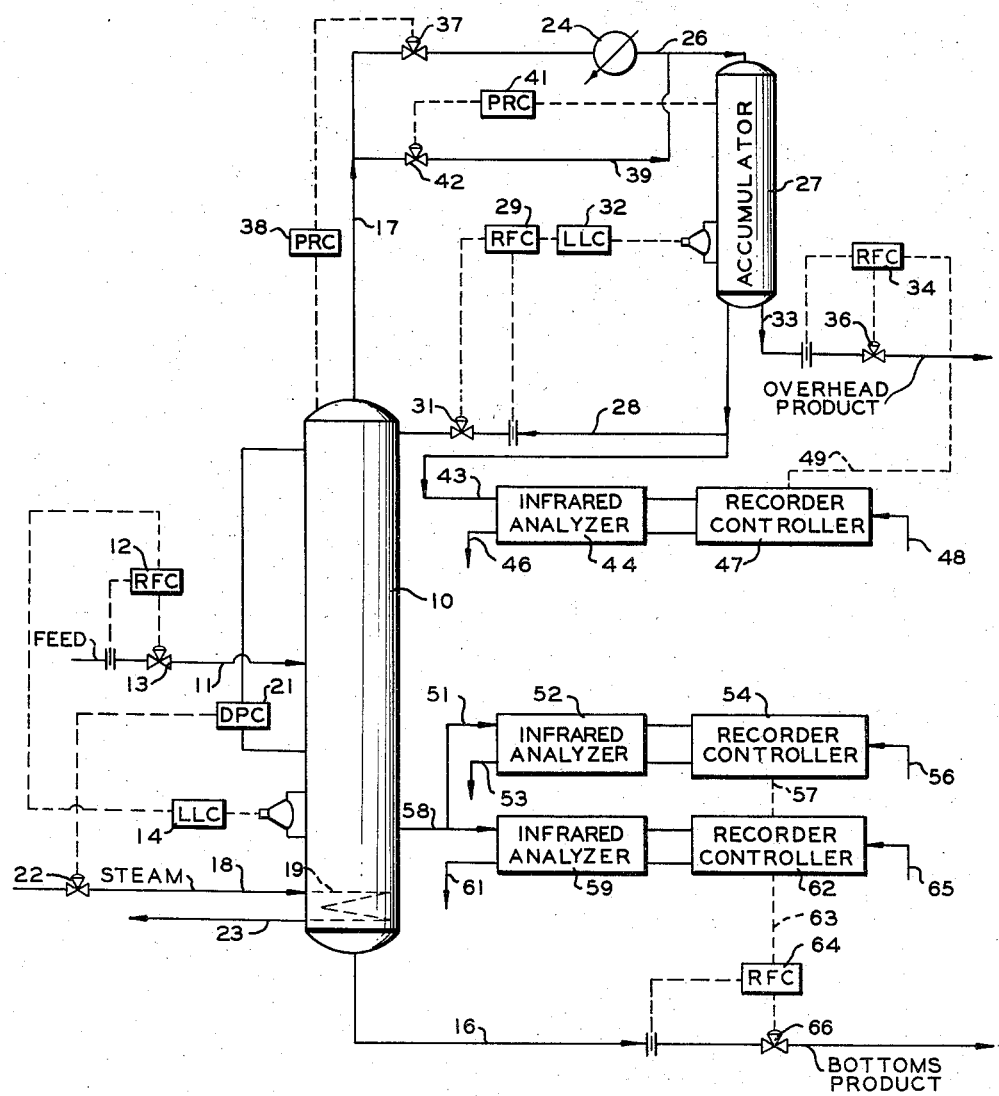
Figure 3 is a schematic view of fractional distillation apparatus, including a modification of the analysis control system of this invention.
Figure 4:
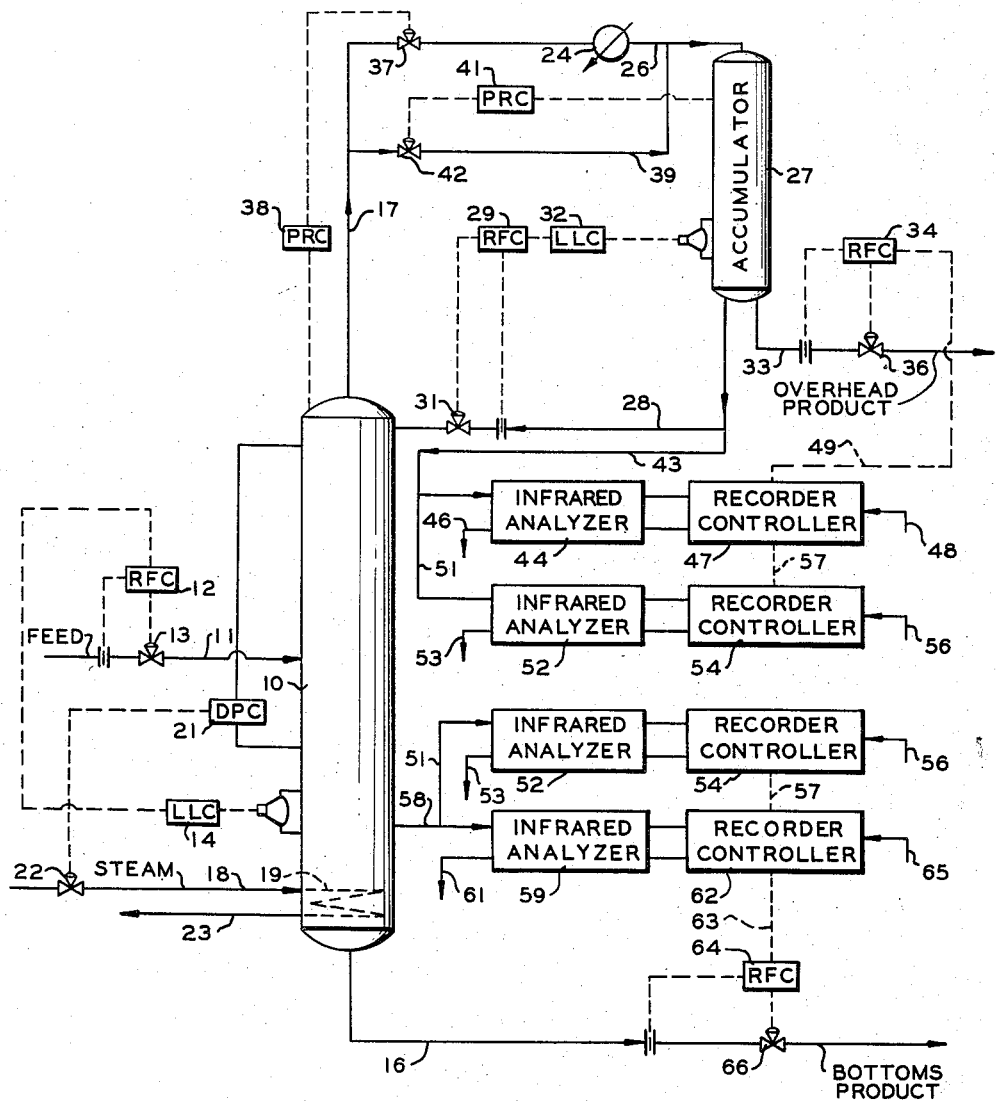
Figure 4 is a schematic view of fractional distillation apparatus, including another modification of the analysis control system of this invention.

In accordance with the invention as described hereinabove, infrared analyzer 52 and its associated controller 54 acts as an override for infrared analyzer 44 and controller 47. It is not intended, however, to limit the invention to this specific arrangement of apparatus, for other arrangements can be utilized which come within the scope of the invention. Thus, in certain separations, it may happen that the third component present in the essentially binary mixture will be removed with the bottoms product. It will then be desirable to provide an infrared analyzer to override the analyzer controlling the bottoms product withdrawal rate. Figure 3 of the drawing, in which identical reference numerals have been used to designate elements previously described in conjunction with Figure 1, illustrates this latter modification of the invention. Furthermore, in processing some feed mixtures, there may be present two additional components in small amounts, one of which is removed overhead while the other is withdrawn with the bottoms product. In such a separation, it will be advantageous to provide an infrared analyzer to override the analyzer controlling the rate of overhead product withdrawal as well as the analyzer controlling the rate of bottoms product withdrawal. Figure 4 of the drawing shows this last-mentioned modification of the invention. Identical reference numerals have been used to designate elements described hereinabove with relation to Figure 1. It is noted also that reference numerals 52 and 54 have been used to designate both of the infrared analyzers and associated recorder-controllers employed as overrides for recorder-controllers 47 and 62 associated with analyzers 44 and 59.

The control instruments as described herein are commercially available items of manufacture, and it is not intended to limit the invention to any specific type of instrument. Although the instruments as described supply a pneumatic signal, it is within the scope of the invention to utilize a type of controller which furnishes an electrical signal in which case electrically operated valves would be used.

Figure 2:
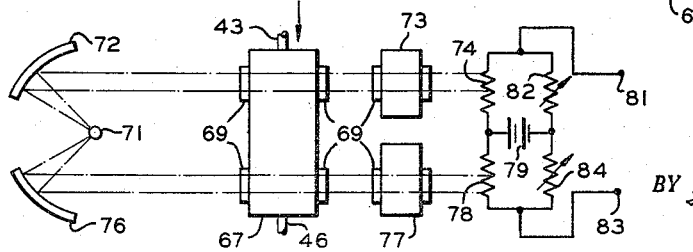
Figure 2 is a schematic representation of an infrared analyzer suitable for use with this invention.

Figure 2 of the drawing illustrates schematically an infrared analyzer which can be used in conjunction with this invention. With reference to infrared analyzer 44, the sample stream removed from accumulator 47 through line 43 is passed through sample cell 67 and vented through line 46. Cell 67 is provided with two pairs of opposing windows 69 made of a material, such as quartz, which is transparent to the desired infrared radiation directed therethrough. Infrared radiation is provided by an element 71 which can be a coil of heated wire. A first beam of radiation emitted from element 71 is reflected from a mirror 72 through sample cell 67 and empty cell 73 to impinge upon a first radiation sensitive electrical resistance element 74. A second beam of radiation from element 71 is reflected from a mirror 76 through cell 67 and filter cell 77 to impinge upon a second radiation electrical sensitive element 78. Cell 73 and filter cell 77 are each provided with a pair of opposing windows similar to those of sample cell 67. Since analyzer 44, as noted above, is sensitized to normal butane, filter cell 77 is filled with a sample of normal butane at atmospheric pressure.

Resistance elements 74 and 78 are connected in adjacent arms of a Wheatstone bridge circuit. The junction between elements 74 and 78 is connected to one terminal of a voltage source 79. The second terminal of resistance element 74 is connected to an output terminal 81 and to the first end terminal of a variable resistance 82. The second terminal of resistance element 78 is connected to a second output terminal 83 and to the first end terminal of a variable resistance 84. The second end terminals of resistors 82 and 84 are connected to one another and to the second terminal of voltage source 79.

When a sample stream containing a small amount of normal butane is circulated through analyzer 44, the radiation received by element 78 is less than the radiation received by element 74 because of the absorption by the normal butane in filter cell 77. With no normal butane in the sample, the difference in radiation received by the two elements would be at a maximum. As the concentration of normal butane in the sample cell increases, however, the radiation received by elements 74 and 78 becomes more nearly equal. The radiation received by element 78 does not change appreciably as the concentration of normal butane increases because that portion of the radiation which is absorbed by normal butane in sample cell 67 was absorbed at the lower concentrations by the normal butane in filter cell 77. The radiation received by element 74, decreases, however, with an increase of normal butane in sample cell 67 because of the absorption by normal butane in that cell. The magnitude of the voltage appearing between terminals 81 and 83 is, therefore, a function of the normal butane content of the sample stream passed to the analyzer through line 43. The output signal from terminals 81 and 83 is applied to controller 47 so that the air pressure in line 49 is a function of the normal butane present in the sample stream removed from the accumulator. The output air pressure from controller 47 is applied through line 49 to the pneumatic set mechanism associated with rate-of-flow controller 34, which in turn, as previously noted, adjusts the set point of the rate-of-flow controller.

Infrared analyzer 52, which is similar to analyzer 44 except that it is sensitized for propane, will also be described with relation to Figure 2. Accordingly, filter cell 77 of analyzer 52 is filled with a sample of propane at atmospheric pressure. With small amounts of propane in the sample stream circulated through sample cell 67, the radiation received by element 78 is less than the radiation received by element 74 because of the absorption by propane in filter cell 77. With no propane in the sample, the difference in radiation received by the two elements would be at a maximum. As the concentration of propane in the sample cell increases, however, the radiation received by elements 74 and 78 becomes more nearly equal. The radiation received by element 78 does not change appreciably as the concentration of propane increases because that portion of radiation which is absorbed by propane was at the lower concentrations absorbed by the propane in filter cell 77. The radiation received by element 74 decreases, however, with an increase of propane in the sample cell because of the absorption by propane in the sample cell. The magnitude of the voltage appearing between terminals 81 and 83 is, therefore, a function of the propane content of the sample stream passed to analyzer 52 by line 51. The output signal from analyzer 52 is applied to controller 54 so that the air pressure in line 57 is a function of the amount of propane present in the sample stream. The output air pressure from controller 54 is applied through line 57 to the pneumatic set mechanism associated with recorder-controller 47 which, as described hereinabove, adjusts the set point of rate-of-flow controller 34. Thus, if the concentration of propane in the sample stream increases above a preselected value, controller 54 in conjunction with the pneumatic set mechanism associated with controller 47 operates to decrease the set point of the control index of controller 47 in an amount corresponding to the increase in concentration of propane.

Infrared analyzer 59 is similar to analyzers 44 and 52 as described hereinabove with relation to Figure 2. Analyzer 59 is sensitized for isobutane, and the magnitude of the voltage appearing between the output terminals of the analyzer is a function of the isobutane content of the sample stream removed from column 10 through line 58. The output signal from analyzer 59 is applied to controller 62 so that the air pressure in line 63 is a function of the amount of isobutane present in the sample stream removed from the column. The output air pressure from controller 62 is applied through line 63 to the pneumatic set mechanism associated with rate-of-flow controller 64. The pneumatic set mechanism, as mentioned hereinabove, adjusts the set point of controller 64 which in turn regulates valve 66 in bottoms product withdrawal line 16.

In accordance with this invention, the fractional distillation column is preferably operated at the maximum throughput obtainable with the installed equipment while producing two products of specification quality. Initially, during the column start-up period, manual control is resorted to with the analyzers being utilized merely to give an indication of the composition of the overhead and bottoms product streams. The pressure drop through the column gives an indication of the load on the column, and it is desirable that the load be as great as possible without causing flooding of the column. The pressure drop which will give such a column loading will vary with the specific apparatus being used and the particular separation being made. It has been found that a pressure drop of about 0.1 p.s.i. per plate for light hydrocarbons up to about 0.15 p.s.i. per plate for heavy hydrocarbons gives this desirable column loading. When the analyzers indicate that the product streams have compositions approaching the specification requirements, the column is then placed on automatic control. In one method for placing the column on automatic control at a steady overhead product rate, the bottoms product rate is controlled manually until the composition of the bottoms as indicated by analyzer 59 approaches the desired composition. At this point, the bottoms product withdrawal rate is switched to automatic control by supplying the output signal from controller 62 to the pneumatic set mechanism of rate-of-flow controller 64. The overhead product withdrawal rate is then adjusted manually until such time that analyzer 44 indicates that the composition of the overhead product approaches the desired composition. The overhead product rate is then switched to automatic control by supplying the output signal from controller 47 to the pneumatic set mechanism of rate-of-flow controller 34.

After the column operation has been lined out and is on automatic control as discussed above, the column operates automatically to produce two products of specification quality. In order to more clearly understand the invention, by way of example, it is assumed that the feed stream contains about 80 mol percent normal butane and 20 mol percent isobutane and that it is desired to recover an overhead product containing 97 mol percent isobutane and a bottoms products containing 98.5 mol percent normal butane. The set points of the recorder-controllers associated with analyzers 44 and 59 are set so as to correspond to these desired product compositions. Analyzer 52, which is sensitized for propane, and its associated recorder-controller 54 operates through the pneumatic set mechanism to reset the set point of controller 47 if any propane appears in the feed stream. For purposes of description, it is assumed that an increase in air pressure tends to open valves 36 and 66. Now, if the analysis of the sample stream passed through analyzer 44 indicates that the overhead product stream contains more than 3 mol percent normal butane, the pressure of the output air signal from controller 47 decreases, and valve 36 is closed somewhat in order to decrease the rate of overhead product withdrawal. Conversely, if the analysis shows that the overhead product stream contains less than 3 mol percent normal butane, then the output signal from controller 47 increases, and valve 36 is opened further in order to increase the rate of overhead product withdrawal. Furthermore, if the analysis of the sample stream passed through analyzer 52 indicates the presence of propane, the set point of controller 47 is decreased in an amount corresponding to the propane concentration in the sample. For example, if the analysis indicates the presence of one mol percent propane in the sample, the set point of controller 47 is reset to correspond to a reading of 2 mol percent normal butane. As a result, the pressure of the output air signal from controller 47 decreases, and valve 36 is closed somewhat in order to decrease the overhead product withdrawal rate.

In the case of the bottoms products, the pressure of the output signal from controller 62 increases or decreases depending upon the analysis of the sample stream removed from column 10 through line 58. If the analysis of the sample stream indicates a kettle product containing more than 1.5 mol percent isobutane, then controller 62 supplies a decreasing air pressure so that valve 66 is closed somewhat, thereby decreasing the bottoms product withdrawal rate. On the other hand, when the analysis of the sample stream shows a kettle product containing less than 1.5 mol percent isobutane, controller 62 supplies an increasing air output so that valve 62 is opened further so as to increase the rate of kettle product withdrawal. Thus, by utilizing a pair of infrared analyzers to control the rate of overhead product withdrawal and the rate of kettle product withdrawal and a third analyzer to act as an override for one of the first mentioned analyzers so as to compensate for the presence of a third component in the feed mixture, it becomes possible to obtain two products of specification quality when operating at a maximum throughput capacity.

The change in any one of the process variables as described hereinabove causes concomitant changes in other process variables. The instrumentation of this invention automatically makes the necessary adjustments so that two products of specification quality are continuously recovered from the column. A clearer understanding of the manner in which such changes are made can be obtained by considering the effect upon the operation of the column of a change in feed composition, e.g., an increase in the normal butane content of the feed stream from 80 mol percent to 84.8 mol percent, the addition of 0.2 mol percent of propane, and a reduction in isobutane from 20 mol percent to 15 mol percent. It is assumed that, as discussed hereinabove, it is desired to recover an overhead product containing 97 mol percent isobutane and a bottoms product containing 98.5 mol percent normal butane.

The propane in the feed stream is detected in the column overhead by analyzer 52. The set point of controller 47 is reset so as to require an overhead product containing no more than 2 mol percent normal butane. As a result of this change in the controller set point and the increase in normal butane content of the feed stream entering the column through line 11, the analysis of the sample stream fed to analyzer 44 through line 43 shows an increase in the normal butane concentration therein above the set point of the analyzer. Controller 47, therefore, supplies an output air signal of decreased pressure, and valve 36 is closed somewhat in order to decrease the rate of overhead product withdrawal.

The reduction in the amount of overhead product removed from the system causes the liquid level in accumulator 27 to rise. As a result, through the operation of liquid level controller 32, the rate at which reflux is supplied to the column to line 28 is increased, thereby increasing the reflux to feed ratio. And because of the increase in the amount of reflux and the reduced amount of isobutane in the feed, the analysis of the sample stream removed from the column through line 58 shows an isobutane concentration which is lower than the set point of controller 62. Controller 62 as a result supplies an air output signal of increased pressure so that valve 66 is opened somewhat, thereby increasing the kettle product withdrawal rate. Since the kettle product withdrawal rate is increased, the liquid level in the bottom of the column is lowered, and liquid level controller 14 operates to increase the feed rate. This increase in feed rate in conjunction with the increased amount of reflux causes an increased pressure drop through the column. As a result, differential pressure controller 21 acts to reduce the steam rate to coils 19, thereby causing a reduction in the amount of vapor rising through the column.

With a reduction of the rate of vapor removed from the column through line 17, the liquid level in accumulator 27 is lowered. Liquid level controller 32 then operates through valve 31 to restore the reflux rate toward its original value. Furthermore, the reduced steam rate brings about an increase in the liquid level in the kettle of column 10. Liquid level controller 14 as a result actuates flow controller 12, tending to reduce the feed rate to the column. It will be apparent from the foregoing discussion that in accordance with the invention the process variables are automatically adjusted in accordance with the new feed analysis so that the feed stream is continuously separated into two product streams of predetermined composition.

A more comprehensive understanding of the invention may be obtained by referring to the following illustrative example which is not intended, however, to be unduly limitative of the invention.

EXAMPLE

Fractional distillation apparatus similar to that illustrated in Figure 1 is utilized to perform the following separation:

*Stream compositions.—Mol percent*

| Component | Feed | Overhead Product | Kettle Product |
|---|---|---|---|
| $C_3H_8$ | 0.1 | 0.5 | |
| i-$C_4H_{10}$ | 20.5 | 96.0 | 2.0 |
| n-$C_4H_{10}$ | 79.4 | 3.5 | 98.0 |

The analyzer sampling overhead product is sensitized for normal butane while the analyzer sampling a stream removed from the 20th tray from the bottom of an 80-tray column is sensitized for isobutane. The analyzer utilized as an override for the analyzer sampling overhead product is sensitized for propane. The infrared analyzers used are the type disclosed in U.S. Patent No. 2,579,825. The potentiometer recorder-controllers, which are used with the infrared analyzers, are each fitted with a pneumatic control unit, and the recorder-controller associated with the analyzer sampling the overhead product is further provided with a pneumatic set mechanism. These instruments are commercially available items of manufacture and may be obtained from the Brown Instrument Company, Philadelphia, Pennsylvania. The rate-of-flow controllers and associated pneumatic set mechanisms are obtainable as a single unit from the Foxboro Company, Foxboro, Massachusetts. In order to obtain a bottoms product having the desired purity, it has been determined that the sample stream removed from the 20th tray should contain 14 mol percent isobutane. The set points of the recorder controllers associated with the three analyzers are set to correspond to the aforementioned stream compositions. Feed is supplied to the column at the rate of 274,000 gallons per day, and a portion of the overhead is returned to the column as reflux at the rate of 1,300,000 gallons per day. Overhead product isobutane is recovered at the rate of 51,000 gallons per day, while the kettle product normal butane is withdrawn at the rate of 223,000 gallons per day. The pressure in the top of the column is 137 p.s.i.g. and in the bottom 144 p.s.i.g. The overhead vapor temperature is 150° F. while the kettle temperature is 179° F. The analyzer sensitized to normal butane automatically controls the rate of overhead product withdrawal so that an overhead product containing 96 mol percent isobutane is recovered. Thus, if the sample stream contains more than 3.5 mol percent normal butane, the analyzer operates to reduce the rate of overhead product withdrawal. Alternatively, if the sample stream contains less than 3.5 mol percent normal butane, the overhead product rate is caused to be increased. Furthermore, if the sample stream contains more than 0.5 mol percent propane, the analyzer sensitized to propane automatically resets the controller of the analyzer sensitized to normal butane so as to compensate for the increase in propane concentration by decreasing the overhead product withdrawal rate sufficiently to decrease the n-butane content of the product by an amount equal to the increase in propane content. The analyzer sensitized to isobutane automatically controls the rate of bottoms withdrawal so that a kettle product containing 98.0 percent normal butane is recovered. If the sample stream contains more than 14 mol percent isobutane, the latter analyzer operates to reduce the rate of product withdrawal. On the other hand, if the sample stream contains less than 14 mol percent isobutane the rate of kettle product withdrawal is increased through the operation of the analyzer.

It will be apparent to those skilled in the art that variation and modifications of the invention can be made upon study of the foregoing disclosure. Such modifications are believed to be clearly within the spirit and scope of the invention.

I claim:

1. In a process for separating an essentially binary feed mixture containing a small amount of third component into two product streams of specification quality in which the process variables include the rate of introduction of feed material into a separation zone, the rate of overhead product withdrawal from said zone, the rate of kettle product withdrawal from said zone and the rate of heat introduction into said zone, the improvement which comprises analyzing a first sample removed from the upper portion of said separation zone to determine the concentration therein of a first component of said mixture; analyzing a second sample removed from the lower portion of said zone to determine the concentration therein of a second component of said mixture; analyzing one of said first and second samples to determine the concentration therein of a third component present in said mixture; adjusting two of said process variables so that the concentrations of said first and second components in said first and second samples remain at preselected values; and changing the preselected value of concentration of one of said first and second components in accordance with the concentration of said third component in one of said first and second samples.

2. A process for separating an essentially binary feed mixture containing a small amount of a third component into two products of specification quality which comprises passing said feed mixture into a separation zone; withdrawing an overhead product from an upper portion of said separation zone; withdrawing a kettle product from a lower portion of said separation zone; introducing heat into said lower portion of said zone; withdrawing a first sample stream from an upper portion of said zone; analyzing a portion of said first sample stream to determine the concentration therein of a first component of said mixture; adjusting the rate of withdrawal of overhead product so as to maintain the concentration of said first component in said first sample stream at a preselected value; withdrawing a second sample stream from a lower portion of said zone; analyzing said second sample stream to determine the concentration therein of a second component of said mixture; adjusting the rate of withdrawal of kettle product so as to maintain the concentration of said second component in said second sample stream at a preselected value; analyzing another portion of said first sample stream to determine the concentration therein of a third component present in said mixture; and changing the preselected value of concentration of said first component in said first sample stream in an amount corresponding to any change in concentration of said third component in said first sample stream from a preselected value.

3. A process for separating an essentially binary feed mixture containing a small amount of a third component into two products of specification quality which comprises passing said feed mixture into a separation zone; withdrawing an overhead product from an upper portion of said zone; withdrawing a kettle product from a lower portion of said zone, introducing heat into said lower portion of said zone, withdrawing a first sample stream from an upper portion of said zone; analyzing said first sample stream to determine the concentration therein of a first component of said mixture; adjusting the rate of withdrawal of overhead product so as to maintain the concentration of said first component in said first sample stream at a preselected value; withdrawing a second sample stream from a lower portion of said zone; analyzing a portion of said second sample stream to determine the concentration therein of a second component of said mixture; adjusting the rate of withdrawal of kettle product so as to maintain the concentration of said second component in said second sample stream at a preselected value; analyzing another portion of said second sample stream to determine the concentration therein of a third component present in said mixture; and changing the preselected value of concentration of said second component in said second sample stream in an amount corresponding to any change in concentration of said third component in said second sample stream from a preselected value.

4. A process for separating a feed mixture consisting essentially of isobutane and n-butane and containing a small amount of propane which comprises passing said feed mixture into a separation zone; withdrawing an overhead product stream containing a predetermined mol percent of isobutane from an upper portion of said separation zone, withdrawing a kettle product containing a predetermined mol percent of isobutane from a lower portion of said zone; introducing heat into said lower portion of said zone; withdrawing a first sample stream from an upper portion of said zone; analyzing a portion of said first sample stream to determine the concentration therein of said n-butane; adjusting the rate of withdrawal of overhead product so as to maintain the concentration of n-butane in said first sample stream at a preselected value; withdrawing a second sample stream from a lower portion of said zone; analyzing said second sample stream to determine the concentration therein of said isobutane; adjusting the rate of withdrawal of kettle product so as to maintain the concentration of isobutane in said second sample stream at a preselected value; analyzing another portion of said first sample stream to determine the concentration therein of propane; and changing the preselected value of concentration of n-butane in said first sample stream in an amount corresponding to any change in concentration from a preselected value of said propane in said first sample stream.

5. A process for separating an essentially binary feed mixture containing a small amount of a third component into two products of specification quality which comprises passing said feed mixture into a separation zone; withdrawing an overhead product from an upper portion of said zone; withdrawing a kettle product from a lower portion of said zone; introducing heat into said lower portion of said zone; withdrawing a first sample stream from an upper portion of said zone; analyzing a portion of said first sample stream to determine the concentration therein of a first component of said mixture; adjusting the rate of withdrawal of overhead product so as to maintain the concentration of said first component in said first sample stream at a preselected value; analyzing another portion of said first sample stream to determine the concentration therein of a third component present in said mixture; decreasing the preselected value of concentration of said first component in said first sample stream in an amount corresponding to any increase in concentration of said third component in said first sample stream above a preselected value; withdrawing a second sample stream from a lower portion of said zone; analyzing a portion of said second sample stream to determine the concentration therein of a second component of said mixture; adjusting the rate of withdrawal of kettle product so as to maintain the concentration of said second component in said second sample stream at a preselected value; analyzing another portion of said second sample stream to determine the concentration therein of a fourth component present in said mixture; and decreasing the preselected value of concentration of said second component in said second sample stream in an amount corresponding to any increase in concentration of said fourth component in said second sample stream above a preselected value.

6. A system for separating an essentially binary feed mixture containing a small amount of a third component into two product streams of specification quality comprising, in combination, a fractionation column, means for introducing said feed mixture into an intermediate portion of said column; means for withdrawing an overhead product from the top of said column; means for introducing heat into the bottom of said column, means for removing a first sample stream from an upper portion of said column; first means for analyzing said first sample stream to determine the concentration therein of a first component of said feed mixture; first control means responsive to said first analyzing means for adjusting one of said withdrawal and introduction means so as to maintain the concentration of said first component in said first sample stream at a preselected value; means for removing a second sample stream from a lower portion of said column; second means for analyzing said second sample stream to determine the concentration therein of a second component of said feed mixture; second control means responsive to said second analyzing means for adjusting another of said withdrawal and introduction means so as to maintain the concentration of said second component in said second sample stream at a preselected value; third means for analyzing one of said first and second sample streams to determine the concentration therein of a third component of said feed mixture; and means for resetting one of said first and second control means in response to said third analyzing means so as to change said preselected value of concentration of one of said first and second components in an amount corresponding to a change in concentration of said third component from a preselected value.

7. A system for separating an essentially binary feed mixture containing a small amount of a third component into two product streams of specification quality comprising, in combination, a fractionation column; means for introducing said feed mixture into an intermediate portion of said column; means for withdrawing an overhead product from the top of said column; means for introducing heat into the bottom of said column; means for removing a first sample stream from an upper portion of said column; first means for analyzing a portion of said first sample stream to determine the concentration therein of a first component of said feed mixture; first control means responsive to said first analyzing means for adjusting one of said withdrawal and introduction means so as to maintain the concentration of said first component in said first sample stream at a preselected value; second means for analyzing another portion of said first sample stream to determine the concentration therein of a second component of said feed mixture; means for resetting said first control means in response to said second analyzing means so as to change said preselected value of concentration of said first component in an amount corresponding to a change in concentration of said second component from a preselected value; means for removing a second sample stream from a lower portion of said column; third means for analyzing said second sample stream to determine the concentration therein of a third component of said feed mixture; and second control means responsive to said third analyzing means for adjusting another of said withdrawal and introduction means so as to maintain the concentration of said third component in said second sample stream at a preselected value.

8. The system of claim 7 in which said first control means adjusts said overhead product withdrawal means and said second control means adjusts said kettle product withdrawal means.

9. In fractionation apparatus for separating an essentially binary mixture containing a small amount of a third component comprising a fractionation column, means for introducing said feed mixture into said column, means for withdrawing an overhead product from said column, means for withdrawing a kettle product from said column, and means for introducing heat into the bottom of said column, the improvement of means for controlling the operation of said column, said control means comprising means for removing a first sample stream from an upper portion of said column; first means for analyzing a portion of said first sample stream to determine the concentration therein of a first component of said feed mixture; first control means responsive to said first analyzing means for adjusting one of said withdrawal and introduction means so as to maintain the concentration of said first component in said first sample stream at a preselected value; second means for analyzing another portion of said first sample stream to determine the concentration therein of a second component of said feed mixture; means for resetting said first control means so as to change said preselected value of concentration of said first component in an amount corresponding to a change in concentration of said second component above a preselected value; means for removing a second sample stream from a lower portion of said column; third means for analyzing said second sample stream to determine the concentration therein of a third component of said feed mixture; and second control means responsive to said third analyzing means for adjusting another of said withdrawal and introduction means so as to maintain the concentration of said third component in said second sample stream at a preselected value.

10. In fractionation apparatus for separating an essentially binary mixture containing a small amount of a third component comprising a fractionation column, means for introducing said feed mixture into said column, means for withdrawing a kettle product from said column, and means for introducing heat into the bottom of said column, the improvement of means for controlling the operation of said column, said control means comprising means for removing a first sample stream from an upper portion of said column; means for removing a second sample stream from a lower portion of said column; a first source of infrared radiation; a first pair of radiation detecting elements; first means for directing first and second beams of radiation from said first source to respective ones of said first pair of detecting elements; a first sample cell disposed in both of said first and second beams of radiation; means for passing a portion of said first sample stream through said first sample cell; a first filter disposed in one of said first and second beams of radiation; first control means responsive to differences in intensity of radiation impinging upon said first pair of detecting elements for adjusting one of said withdrawal and introduction means of said column; a second source of infrared radiation; a second pair of radiation detecting elements; second means for directing third and fourth beams of radiation from said second source to respective ones of said second pair of radiation detecting elements; a second sample cell disposed in both of said third and fourth beams of radiation; means for passing another portion of said first sample stream through said second sample cell; a second filter disposed in one of said third and fourth beams of radiation; means responsive to differences in intensity of radiation impinging upon said second pair of detecting elements for resetting said first control means; a third source of infrared radiation; a third pair of radiation detecting elements; third means for directing fifth and sixth beams of radiation from said third source to respective ones of said third pair of detecting elements; a third sample cell disposed in both of said fifth and sixth beams of radiation; means for passing said second sample stream through said third sample cell; a third filter disposed in one of the same fifth and sixth beams of radiation; and second means responsive to differences in intensity of radiation impinging upon said third pair of detecting elements for adjusting another of said withdrawal and introduction means of said column.

References Cited in the file of this patent

UNITED STATES PATENTS

| | | |
|---|---|---|
| 2,553,469 | Pellettere | May 15, 1951 |
| 2,579,825 | Hutchins | Dec. 25, 1951 |
| 2,617,940 | Giguere | Nov. 11, 1952 |
| 2,764,536 | Hutchins | Sept. 25, 1956 |